Aug. 28, 1934.　　　　J. Z. MILLAR　　　　1,971,755

SIGNAL REPEATER

Filed May 28, 1932

INVENTOR:
J. Z. MILLAR

Eugene C. Brown
ATTORNEY

Patented Aug. 28, 1934

1,971,755

UNITED STATES PATENT OFFICE 1,971,755

SIGNAL REPEATER

Julian Z. Millar, Southampton, N. Y., assignor to The Western Union Telegraph Company, New York, N. Y., a corporation of New York Application May 28, 1932, Serial No. 614,199

6 Claims. (Cl. 178—70)

This invention relates to signal repeaters or amplifiers, particularly to signal repeaters employing thermionic relay devices and it has for an object to provide a repeater which will produce a substaniatlly "square topped" signal output from a signal input which may be either of a sine wave form, a substantially rectangular wave form, or in any intermediate form.

Another object is to provide a signal repeater which will produce a signal output of substantially uniform value from a signal input of varying value.

A further object is to provide a signal repeater which will produce a steep rise and fall of the signal output as it passes from one extreme value to the other.

Still another object is to provide a signal repeater or amplifier which is particularly adapted for operating a "direct wire", indicator, or other type of relay by accomplishing a complete reversal of a current flow through said relay devices with a signal input to the repeater which varies between zero and either a positive or negative value, or a signal input which varies between a negative and positive flow.

A still further object is to provide a signal repeater or amplifier which is particularly adapted to repeating three element signals, that is, for accomplishing a current flow through said output device in one direction when a signal input is in a given direction, a zero output when a signal input is zero or when certain elements form zero value, and current flow through said output devices in the other direction when a signal input is in a direction the reverse of the initial direction.

These and other objects will more fully appear from the following description taken in connection with the accompanying drawing.

Ordinarily "square topped" signal output is produced by electro-magnetic relays, but is not commonly associated with thermionic relays. Ordinarily thermionic relays are employed for reproducing without distortion waves of varied intensity.

However, a telegraph repeater has been proposed which provides vacuum tubes in place of electro-magnetic relays and which may produce in its output circuit a substantially square topped wave. Such devices have heretofore required specially designed output circuit. Furthermore, they are more or less unsuitable for feeding signals directly into a receiving or recording device, so as to effectively operate the receiver or recorder for recording signals having prolonged marking and spacing elements. A repeater operating to feed signals into an amplifier or a short line section may be operated principally as a potential device. On the other hand, entirely different characteristics are required when the repeater is coupled directly to a magnetic relay operating as a receiving device for recording or receiving the signals.

According to this invention a pair of output tubes are employed in the repeater coupled in substantially bridge circuit relation. In other words, the signal input circuit is coupled across the signal source and the output circuit is coupled across the relay or receiving device so that the tubes operate alternately to pass current through the receiving device in one direction for one value of the signal input and in the opposite direction for another value. When the output device is of the type known as a signal "writer" embodying an actuating coil through which the repeater output current is directed, a movement is produced in the coil in response to a signal change in either direction holding the coil in each extreme position for substantially the duration of each signal value. In other words, a signal wave embodying marking signals and spacing signals may be reproduced and recorded by a receiving device in the output circuit of the repeater which produces marking signals in one extreme position and spacing signals in the other extreme position of substantially any length.

A "writer" of this type has a mechanical bias which tends to hold the coil central between the extreme position in either direction when no current is flowing in the coil. It follows that this type of coil may also be used for reproducing three element signals, the output of the repeater in this case varying between a current value in one direction, substantially zero, and a current value in the other direction. In the case of two element signals, where no zero position is required, means to bias the coil to a central position may be dispensed with or reduced to a negligible value.

In order to produce signals of three element form, a repeater constructed according to this invention is arranged so that at substantially mean signal value, both of said tubes are preferably biased to substantially cut-off point so that neither tube is passing current. As a variation from this both tubes may be biased below the cut-off point to widen the range of zero signal or both of said tubes may be biased an equal amount above the cut-off point so that no potential is developed across the output device for the mean or zero position of the input signal, provided of course, that neither tube is saturated but is operating at some point well below the point of saturation, preferably a point near the center of its current characteristic for a mean or zero value signal input. Either of the first two methods may be employed in repeating two element signals.

The square top operation is accomplished by supplying biasing means of such character that as the signal input swings a small amount from the mean value in either direction, a saturated condition is produced in the tube responding to that part of the signal, and a cut-off condition in the other tube. As the signal reaches a value which produces the saturated condition, any further increase of the signal produces no increase in the output of the amplifier and the result is that the apex of the signal wave is cut off and the reproduced signal is formed of the base of the signal wave having rather steep side portions and a flat top. One of the tubes responds to reproduce that part of the signal extending from the mean value in one direction, while as the signal swings through the mean value in the opposite direction, the other tube responds to reproduce that portion of the signal. The tubes being coupled in bridge circuit relation, the output of the tubes will pass through the coil of the receiving device in opposite directions. When the writer coil is operated by signal currents traversing it in opposite directions, no mechanical bias toward one extreme position is necessary. The elimination of mechanical bias permits the device to operate at a maximum sensitivity.

For a further description of this invention reference will be had to the accompanying drawing in which.

This invention may be adapted to respond to either duo- or uni-directional signals, in other words to signals varying between a negative and a positive value and also signals varying between zero and a positive value. A change of the apparatus from a condition in which it responds to duo-directional signals to one in which it responds to uni-directional signals may be accomplished by altering the grid bias means of the respective tubes in the repeater, as will presently be explained.

Figure 1:
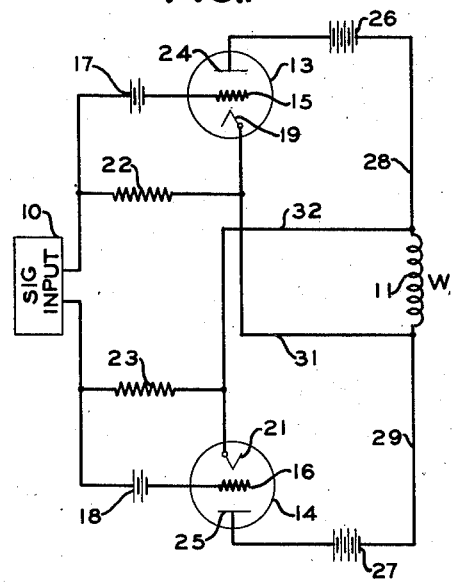
Fig. 1 is a circuit diagram illustrating the embodiment of the invention adapted to respond to duo-directional signals.
Figure 4:
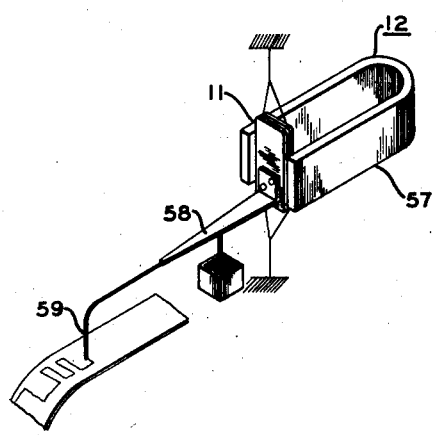
Fig. 4 is a diagrammatic illustration of the receiver or writer.

Referring now to Fig. 1, the circuit diagram for the repeater arranged to respond to duo-directional signals is illustrated. It comprises the "signal input" source 10 and a signal output W comprising the writer coil 11. The signal output comprises the actuating coil of a recorder or writer 12 as illustrated in Fig. 4. A pair of tubes 13 and 14 of the grid control type are arranged with their grids 15 and 16 respectively connected to the signal input circuit through biasing batteries 17 and 18. The cathodes 19 and 21 respectively are connected to the signal circuit through resistances 22 and 23. It will be observed in addition that the signal circuit is arranged to include the writer coil 11 also. In other words, the path of a signal would be through resistance 22, the drop through which influences the grid 15, and then through the coil 11 in the same direction as the current flowing from the tube 13 and returning through resistance to 23 to influence the grid 16. The anodes 24 and 25 of the respective tubes are connected through batteries 26 and 27 which furnish suitable potential to the anodes through conductors 28 and 29 across the coil 11 returning to the cathode through conductors 31 and 32 respectively.

The apparatus constructed according to the diagram of Fig. 1 may be arranged to respond to duo-directional signals such as telegraphic or cable signals in at least two distinct manners, according to the amount of grid bias supplied by the batteries 17 and 18. When the batteries 17 and 18 bias the respective tubes to or slightly above the cut-off or no current flow condition of the tube, the response of the amplifier will include a rise and fall in the signal output corresponding to each rise and fall in the signal input. On the other hand, if the grid bias supplied by the batteries 17 and 18 is sufficient to bias the tubes below the cut-off or no current flow condition, the amplifier may be arranged to respond to only those signals in the input which are greater than a predetermined value.

The operation of the amplifier when biased substantially at or above the cut-off point will be first described. Considering the signal input wave to be of a positive value and traversing the signal input circuit in a direction to make the grid 15 positive, the signal will traverse the input circuit in a direction from negative to positive substantially as follows. If the upper portion of the circuit is considered as going positive, then the lower portion will be negative and the drop in potential across the resistance 23 will be additive to the battery 18 and only increase the negative bias of the grid 16 in the lower tube. This has no effect upon the tube except to entirely stop the current flow if the normal bias is not sufficient to accomplish this. The current then proceeds along conductor 32 downward through the coil 11 along the conductor 31 and across the resistance 22. The drop across the resistance 22 imposes a positive potential upon the grid circuit in opposition to the battery 17 and of sufficient value to overcome the negative bias of the battery and render the grid 15 positive, permitting the tube 13 to pass a current. As the current flows through the tube 13, in a direction from negative to positive, the current passes from the cathode 19 to the anode 24, and through the anode circuit including the conductor 28, the coil 11 and the conductor 31. It will be observed that the direction of this current is the same through the coil 11 as that resulting from the input signal. When the signal input swings in the opposite direction, the conditions imposed upon the tubes 13 and 14 will be reversed, the tube 13 becoming non-conductive and the tube 14 responding to that part of the signal to send a current through the coil 11 in the opposite direction. In other words one tube responds to one part of the signal wave and the other tube to the other part.

In order to produce a flat topped reproduction of the signal, the values of the resistances 22 and 23 are such that with an input signal current of relatively small value, the drop across these resistances is such as to produce a potential sufficient to saturate the tubes. Any increase in the value of the signal current will not increase the output of the tubes. In this manner the upper and lower extreme portions of the signal wave are not effective to produce a further rise or fall in the signal output. In other words, the apex of the upper and lower portion of the wave is cut off and the reproduced portion of the wave comprises only so much of the base portion of the wave as is required to produce the saturated condition of the tubes. From this it will be seen that an apparatus is provided for reproducing signals of original sine wave form as attenuated signals, in substantailly square topped form. Another result produced by this arrangement is that a signal input of varying value will be reproduced as a signal of substantially uniform value if the signal input does not become less than that required to saturate the tubes.

When the biasing batteries 17 and 18 are of sufficient value to bias the tubes below the cut-off point, the middle portion of the signal produces no effect on the tubes. Only values beyond the middle portion are effective, one of the tubes responding to the values above the midportion and the other to those below. In other words, the value of the signal wave must reach a certain point before it produces any response in the amplifier or repeater, and any signal waves within this value are reproduced by the writer as a straight line. In other words, the response of the repeater is somewhat similar to a Brown relay. The excess bias produces a result corresponding to his no man's land in which signals of insufficient value to overcome the condition produced by having a no man's land have no effect on the signal output. This arrangement will serve substantially the same purpose as the Brown relay in receiving cable signals comprising the so-called three point code values of positive, negative and zero.

When the amplifier is operated in the above described manner, the upper limit response feature is also retained. That is, the biasing means supplied for each tube is of such a nature that a relatively small signal input above the amount required to energize the tube will produce a saturated condition of the tube. In other words, received cable signals embodying values varying only slightly from zero and values which vary greatly from zero, will reproduce the maximum variations in square top form and the minimum variations in straight line form.

Figure 2:
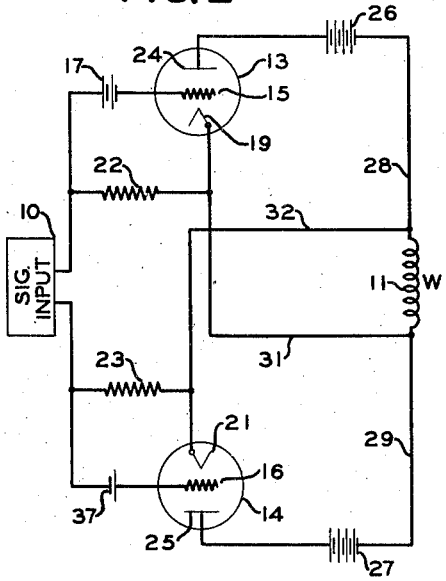
Fig. 2 illustrates a circuit diagram for uni-directional signals.

Another form of this invention illustrated in Fig. 2, is particularly adapted to receive code signals of an interrupted continuous wave type. In this type of communication spacing signals are represented by a condition of no signal transmission, while marking signals are represented by periodic pulses of signal waves. When these signals are received by the common rectifier method they appear as unidirectional signals having an amplitude which varies from zero to some positive value. Therefore, if such rectified signals are employed to actuate the polarized coil of a writer, such as that illustrated in Fig. 4, they will move the indicator or recorder element of the writer in only one direction from its normal position of rest. Ordinarily the recording element or arm of the writer instrument normally rests in a substantially mid-position in a condition of no sigal input. In order to use substantially the full effective movement of the coil when operating the same by unidirectional signals, it is necessary to apply some type of biasing means to hold the writer arm preferably to some position at one side of the mid-position near the extreme limit of movement in that direction. This could be accomplished by means of a mechanical bias such as a spring to pull the arm over to this position. However, mechanical bias decreases the sensitivity of the writer. In order for the marking signals to be effective to move the writer arm to the opposite extreme position, the mechanical bias must first be overcome. Furthermore any type of mechanical bias elements add inertia to the moving parts of the writer, causing the same to be sluggish in its response to the signal current.

According to the embodiment in Fig. 2 means is provided for eliminating the necessity of any type of mechanical bias, accomplishing the bias electrically by causing a current to flow through the writer coil during conditions of no signal input. This current flow condition may be accomplished in a number of different ways. The preferred method of accomplishing electrical bias comprises means for unbalancing the output or load circuit of the amplifier so that in a state of no signal input one of the tubes passes a greater amount of current than the other, causing a current to flow through the coil of the writer instrument in a direction to swing the arm over to a position below its normal mid-position. The amplifier circuit is further arranged so that when a surge of signal current enters the amplifier the unbalanced condition of the circuit is shifted or reversed causing a current to flow through the writer coil in the opposite direction, swinging the writer arm toward a position above the mid-position.

The method of establishing the unbalanced condition comprises providing means to establish a positive bias on one tube and a negative bias on the other tube during periods of no signal input. Referring to Fig. 2 battery 37 is inserted in the grid circuit of tube 14 with its positive side connected to the grid 16. This establishes a current flow condition in the tube 14. Preferably the bias is sufficient to establish a saturated current flow condition in the tube so that disturbances do not increase the normal current through coil 11. However, a saturated condition is not absolutely required in this tube. With regard to the tube 13 preferably biasing means such as battery 17 is connected in the circuit of the grid 15 so as to bias this tube substantially to the cut-off point during condition of no signal input. While it is not necessary that the bias be absolutely to the cut-off point, the prevention of the current flow through the anode circuit of this tube removes all countercurrent from the coil 11 during no signal input. When the grids of the respective tubes are biased as just described, the result is that in a state of no signal input the tube 14 will pass current causing a flow through the writer coil 11 in a direction from the point where the conductor 29 connects with the coil toward the point where the conductor 28 leaves the coil.

The amplifier is connected in the signal circuit so that its upper side is joined to the positive side of the signal circuit. Then as a surge of signal current is impressed upon the amplifier, the drop in potential across the resistance 22 impresses upon the grid 15 a potential which is positive with respect to cathode 19 and of such a value as to overcome the negative bias of the battery 17 and establish a current flow condition through the tube. On the other hand, the drop in potential across the resistance 23 would impose a negative potential on the grid 16 with respect to the cathode 21 of the tube 14 of sufficient value to overcome the positive bias of the battery 37 and establish a substantially blocking condition in this tube. The result will be that as the current from the tube 12 traverses the conductor 28 entering the coil 11 on the upper side and the conductor 31 leaving the coil from the lower side, it will flow through the writer coil 11 in a direction opposite to that flowing through the coil in a state of no signal input.

As already stated the values of the resistances 22 and 23 are relatively high so that the drop in potential of a relatively small current flowing through the resistances would be of a sufficient value to impose the required potential upon the grids of the respective tubes 13 and 14 to cause not only a reversal of the current flow in the output of the amplifier circuits from a state of no signal input to a state of signal input of a certain predetermined minimum value but also a saturated condition of the responding tube 13. In practice it has been found that the value of the circuit elements may be so proportioned that a signal input of a small value compared with the maximum input under normal conditions will reverse the unbalanced condition of the circuit to such an extent as to establish substantially a saturated current flow condition into tube 13 and a blocked condition into tube 14.

The result of imposing such operating conditions will appear clearly advantageous when the amplifier is employed for receiving signals carried by wireless or radio waves due to the fact the signal intensity varies considerably between a minimum usable strength and its maximum strength. Due to this phenomena, which is ordinarily termed as "fading", the signal strength may vary as much as several hundred to one. When the signals are recorded by the writer it is very desirable that they appear not only of uniform height but also in what is termed substantially square top form. In other words, the writer arm should move to its extreme upper position substantially as soon as an incoming signal has energized the amplifier circuit and remain at this upper extreme position until the incoming signal had decreased to substantially zero. In this embodiment this result has been accomplished by adjusting the amplifier so that it will respond to reverse the direction of the current output by a signal input current of a very low value, such as for example ¼ to ½ milliampere.

In operation, as the signal input rises, the output of the tube 14 begins to decrease, and when the input reaches a predetermined initial value the current begins to flow from tube 13 and finally at another predetermined value of between ¼ and ½ milliampere, the current from tube 13 overcomes that flowing from tube 14 causing the current through the writer coil 11 to reverse and begin to flow in the opposite direction. As the signal continues to rise the tube 13 reaches the limit of its output by becoming saturated, causing the coil to swing its arm to its upper limit. The amplitude of the incoming signal may reach several milliamperes but since the writer arm has been swung to its upper position substantially by the time the signal has reached the value between 1 and ½ milliampere, obviously any increase in the signal amplitude causes no further movement of the writer coil and arm. This arrangement produces two desirable results. Firstly, the writer coil arm remains at its extreme upward position while the signal rises in its cycle of travel beyond and recedes to the value of ½ milliampere causing the signal as recorded to be substantially flat topped. Secondly, substantially the same response is produced by a signal rising only slightly above the ½ milliampere value that is produced by a signal rising several milliamperes above that value. The ability of the circuit to completely reverse the output is the most essential feature in providing an extremely sensitive response of the writer to weak signals. The method of limiting the current flow in each direction provides square topped or attenuated signal output and at the same time a uniform output from a varying input.

Another method which may be employed for this type of circuit to produce a similar result would be to unbalance the circuit by applying different potentials to the anodes of the respective tubes 13 and 14, maintaining the potential of the grids of both tubes at substantially the same value for a state of no signal input. If the potential on the anode of the tube 14 is greater than that on the tube 13 the former tube will pass a greater amount of current than the latter, causing the current to flow through writer coil in one direction. When a surge of signal current is impressed upon the amplifier circuit the grids are influenced substantially as described in the foregoing arrangement. The potential of the grid 16 of the tube 14 is lowered while that of the grid 15 of the tube 13 is raised until the difference in potential of the grids reach a value which causes the amount of current passed by the tube 13 to become greater than that passed by the tube 14, reversing the current through the coil 11. Any other method of establishing an unbalanced output of the amplifier employing means to cause the current to be reversed in the circuit by received signals may be used.

Figure 3:
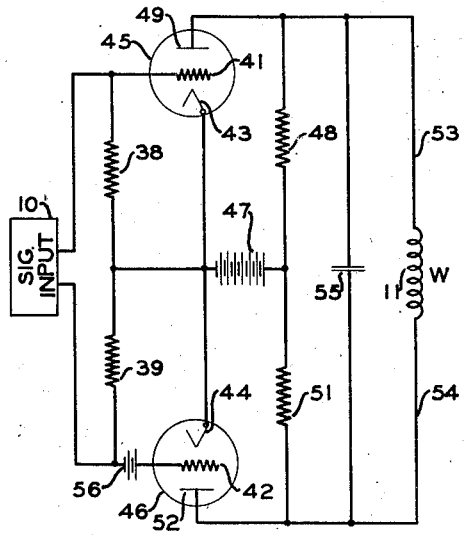
Fig. 3 is an illustration of a circuit diagram for the invention employing arc discharge tubes.

The arrangements described above are intended for use in connection with the ordinary high vacuum type of electronic device. Practically the same operation of a writer coil may be produced by an amplifier using arc discharge tubes commonly known in the art as having trigger operating characteristics. Figure 3 is a diagrammatic illustration of an amplifier circuit employing this type of tube. It comprises a signal input 10 connected across a circuit including resistances 38 and 39. These resistances 38 and 39 are also in circuit with control grids 41 and 42 and the cathodes 43 and 44 of the tubes 45 and 46 respectively. The cathodes are connected in the signal circuit by a common conductor at a point between the resistances 38 and 39. The anodes of the tubes are supplied with potential from a common battery 47 having its negative side connected through a common conductor to the cathodes of the respective tubes and having its positive side connected through the resistance 48 to the anode 49 of the upper tube 45 and through the resistance 51 to the anode 52 of the lower tube 46. The writer coil 11 is connected directly to anodes of the respective tubes through a shunt circuit formed by the conductors 53 and 54. There is also a condenser 55 in shunt circuit between the anodes of the respective tubes.

In order to cause this circuit to function a means, such as battery 56, is connected in circuit to apply a positive potential to the grid of one of the tubes, tube 46 in the illustration. This positive potential is of such a value that in state of no signal input it will cause the tube to be triggered off or to become energized in a well known manner. One of the characteristics of arc discharge tubes is that once they have become energized they are no longer subject to control by the grid. Therefore they must be deenergized in some other manner. One method of deenergizing this type of tube when two of the tubes are connected in any type of bridge circuit is to insert a condenser of a suitable size in shunt between the two cathodes. In the circuit illustrated in Figure 3 the action is substantially as follows. When a signal input current surge is impressed on the amplifier circuit the potential of the control grid 41 of the upper tube 45 will be raised to some positive value with respect to the cathode 43 triggering off the tube or causing it to become energized. Simultaneously a potential of a negative value would be imposed upon the grid 42 of the lower tube 46 reducing the potential of that grid to below the triggering point. Upon the upper tube becoming energized current flow of a full normal potential is immediately established. This having taken place the deenergizing or quenching of the lower tube would be accomplished by a reversal of the charge condition across the condenser 55. It will be seen that when the lower tube was first energized the lowest section of the condenser 55 would be positively charged with respect to the upper section. As soon as the upper tube is energized the charge on the upper portion of the condenser 55 would be changed suddenly to positive. This will cause a charge on the lower side of the condenser to be immediately reversed resulting in the feeding of a reverse current surge to the anode circuit of the lower tube momentarily reducing the potential on the anode to substantially zero.

With this type of tube an opening of the anode circuit or a momentary reduction of the potential on the anode to zero would cause the arc discharge in the tube to break down and the tube become quenched or deenergized. Therefore through the action of the condenser 55 the energization of one of the tubes causes the other tube to become deenergized. In this manner the operation of the respective tubes in the amplifier will cause a reversal of the flow of current through the output circuit of the tubes for each cycle of the input signal. Even though, as will be observed, the output of the amplifier tubes follows a divided path comprising one of the resistances for one part and the other resistance plus the writer coil for the other part, ample current will be supplied to the writer coil for effective operation thereof, due to the fact that this type of tube passes current greatly in excess of that required for operating the writer. A trigger tube arrangement will respond to duo-directional signals if similar biasing means of a suitable value are provided for both tubes.

The diagrammatic illustration of a form of writer employed in the preferred embodiment of this invention is illustrated in Figure 4. The writer comprises a magnet 57 for establishing a magnetic field within which is suspended the writer coil 11. The coil 11 is mounted upon a block or armature and is suspended by a suitable means tending to hold it in a normal mid-position between the poles of the magnet. An arm 58 is mounted to the armature of the coil 11 and carries the writer element 59, which may be of the well known syphon type. The response of the writer coil is polar in action, that is, it will tend to rotate through a certain arc in one direction in response to a current flow in one direction and will tend to rotate through an arc in the opposite direction in response to a reversal of the current. Any type of writer instrument having a polarized operating coil may be employed in connection with the amplifiers of this invention.

From the foregoing description it will be observed that arrangements have been provided for operating a writer, relay indicator or recorder instrument which will produce a complete reversal of the current through the operating coil with signal input of a uni-directional as well as a duo-directional value. In addition it will be seen that an arrangement has been provided which will respond to signals of varying intensity or to the so-called fading signals in such a manner as to produce a substantially uniform operation of the indicator or writer instrument. It will further be observed that the action produced in the operating coil of the writer or recorder instrument will be of such a nature as to produce substantially a square top signal record from signals varying greatly in intensity.

While this invention has been shown in but three forms, it will be apparent to those skilled in the art that it is not so limited but is subject to various other changes and modifications without departing from the spirit thereof and it is desired therefore that only such limitations shall be placed thereon as are imposed by the prior art or as set forth in the appended claims.

What I claim is:

1. In a system for receiving uni-directional telegraphic signals varying between zero and some positive value, a signal repeater and a recorder operated by said repeater, said recorder embodying a writer arm and a polarized coil for actuating said arm, said repeater embodying a signal input circuit and a pair of grid controlled output tubes having grid, cathode, and anode elements, the anodes of said tubes being connected to their cathodes in opposition across said actuating coil, the grids being connected to said input circuit and to the respective cathodes, means for biasing the grids of said tubes, one to a greater extent than the other, whereby in a state of signal input of zero value a current will flow through said actuating coil to bias said writer arm to one extreme position.

2. The combination of a recorder and a signal repeater for operating the recorder, said recorder embodying an operating coil, said repeater embodying a pair of triode tubes coupled substantially in bridge circuit relation, an input circuit and an output circuit for said tubes, said operating coil being connected in both circuits in series so as to form an impedance common to both.

3. A signal repeater embodying first and second electronic tubes each including a cathode, a grid, and a plate, means providing grid and plate circuits for connecting the grids and plates respectively with their cathodes, a signal input circuit to which the grid circuits of the respective tubes are coupled in series, a signal transfer impedance across which the plate circuits are coupled in opposition, grid bias means of unequal biasing value included in said grid circuits and arranged to apply a greater bias to the grid of the first tube than the second, whereby, when the value of the signal input is zero, the output of the first tube is less than that of the second, causing a current to flow through the signal transfer circuit in one direction, the relative value of the bias means for said grids being such that as the signal input rises to some predetermined positive value less than the normal total rise the bias differential is overcome, whereby the output of the first tube becomes greater than that of the second causing a reversal of the current flow through the load circuit.

4. In a signal repeater, a pair of triode electron tubes, a signal input circuit, a grid circuit for the respective tubes connected in said input circuit in series, an output impedance, means to connect one end of said impedance to the cathode of one tube and the other end to the cathode of the other tube, and means to connect the end opposite the end connected to the cathode of the respective tubes to the anode thereof whereby said impedance substantially in its entirety is common to the anode circuit of both tubes.

5. In a repeater, a signal source, an output impedance, and means for passing both the current from the signal source and the reproduced current through the output impedance, said means embodying a signal input circuit arranged to connect said impedance in series with said signal source, a triode tube for reproducing said signals, means for impressing the incoming signals upon the grid of said tube and circuit means for connecting the cathode of said tube to one side of said output impedance and means to connect the anode of said tube to the other side of said output impedance and means in the circuit between the anode and the impedance for supplying anode potential.

6. In a repeater, a signal source, an output impedance, and means for passing both the current from the signal source and the reproduced current through the output impedance, said means embodying a signal input circuit arranged to connect said impedance in series with the signal source, a pair of triode tubes for reproducing said signals, means connecting said tubes substantially in bridge circuit relation, said means including means for impressing the incoming signals upon the grids of said tubes, and circuit means for connecting the cathodes of the respective tubes to the opposite ends of said impedance, and circuit means for connecting the anodes of the respective tubes to the end of said impedance opposite the respective cathode connections, and means in circuit between the respective anodes and the impedance for supplying anode potential.

JULIAN Z. MILLAR.